FIXED FREQUENCY PHASE MEMORY APPARATUS

Filed Aug. 3, 1965 2 Sheets-Sheet 1

INVENTOR
William H. Beck
BY
ATTORNEY

May 21, 1968 W. H. BECK 3,384,821

FIXED FREQUENCY PHASE MEMORY APPARATUS

Filed Aug. 3, 1965 2 Sheets-Sheet 2

INVENTOR
William H. Beck
BY
T. H. Murray
ATTORNEY

United States Patent Office 3,384,821

Patented May 21, 1968

3,384,821
FIXED FREQUENCY PHASE MEMORY APPARATUS

William H. Beck, Pittsburgh, Pa., assignor to the United States of America as represented by the Secretary of the Army Filed Aug. 3, 1965, Ser. No. 476,919
6 Claims. (Cl. 325—13)

ABSTRACT OF THE DISCLOSURE

Described is apparatus for generating a signal having the same frequency and phase relationship as an input signal, which apparatus includes an oscillator having a frequency equal to $n$ times the frequency of the input signal, a counter operatively connected to the output of the oscillator for producing an output signal for every $n$ cycles of the oscillator, means coupled to the output of the counter for comparing the phase of the signal from the counter with the phase of said input signal, and means coupled to the phase comparing means for blanking pulses from the output of the oscillator to said counter until the phase of the signal at the output of the counter is substantially the same as the phase of the input signal.

While not limited thereto, the present invention finds particular utility in a civil defense warning system of the type wherein a warning signal of a particular frequency is impressed upon the power lines of an electrical distribution system. Such a signal, generated in case of enemy attack, can be detected by a special receiver in every home, business establishment or the like serviced by the power distribution system so as to give an audible or other similar alarm.

In such systems, it is impossible, or at least impractical, to generate a single signal from one station of sufficient power to reach all parts of the distribution system. Accordingly, it becomes necessary to employ spaced signal generators throughout the system, all of which must generate signals of the same frequency and phase relationship. Otherwise, if the signals did not have the same phase relationship, the one signal would damp the other, and vice versa.

Ordinarily, warning systems of this type employ a master signal generator which is activated first. The signal from this generator is then used to activate another, or other, signal generators at spaced points throughout the system. In order to accomplish this, it is necessary for the signal generators, remote from the master generator, to memorize the phase of the relatively weak signal already on the power line. Otherwise, when the remote sources begin to generate, they will overwhelm the relatively weak signal from the master generator such that their optimum phase position can no longer be determined.

Accordingly, as one object, the present invention seeks to provide apparatus for memorizing and retaining the phase of an oscillatory or pulsating electrical signal.

Another object of the invention is to provide apparatus, responsive to a relatively weak oscillatory or pulsating electrical signal, for generating a stronger signal of the same frequency and phase relationship, which stronger signal overwhelms the weaker signal.

A further object of the invention is to provide a phase memory system of the type described in which the memorized signal accuracy and phase position will remain undisturbed when a reference signal is removed until the system is again required to reproduce the phase position of another reference signal.

Still another object of the invention is to provide a phase memory system which is relatively low in cost and which will enable large and rapid phase shifts without sacrificing extreme oscillator accuracy specifications.

Finally, a still further object of the invention is to provide a phase memory system which is essentially insensitive to variations in temperature, voltage or component tolerances.

In accordance with the invention, there is provided an oscillator having a frequency equal to $n$ times the frequency of a remote input signal, a counter operatively connected to the output of the oscillator for producing an output signal for every $n$ cycles of said oscillator, means coupled to the output of said counter for comparing the phase of the signal from the counter with the phase of said remote input signal, and means coupled to the phase comparing means for blanking pulses from the output of said oscillator to said counter until the phase of the signal at the output of the counter is substantially the same as the phase of said input signal. Preferably, the oscillator is a square-wave oscillator; while the phase comparing means comprises a circuit adapted to generate a pulse when the output of the counter and the remote signal are not in phase. This pulse, after differentiation, is used to blank input pulses to the counter such that the output of the counter and, hence, the desired signal, is shifted in phase. As will be understood, the blanking process continues until the phase at the output of the counter is equal to, or substantially equal to, that of the remote signal source.

The above and other objects and features of the invention will become apparent from the following detailed description taken in connection with the accompanying drawings which form a part of this specification, and in which:

FIGURE 1 is a block diagram of the phase memory system of the invention as applied to a civil defense warning system or the like;

Figure 3:
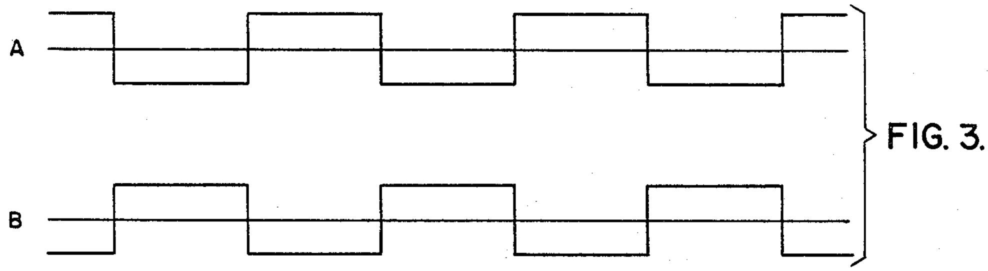
Figure 4:
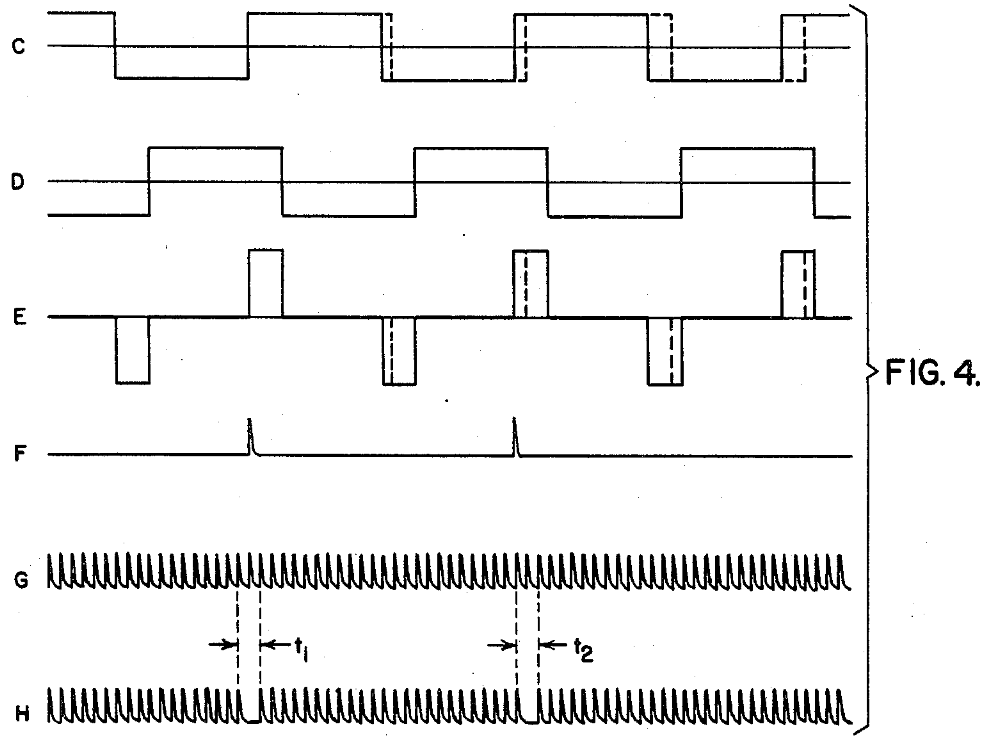

FIG. 3 comprises wave forms illustrating the phase relationships of the input signal and the output of the counter when the two are in phase; and FIG. 4 comprises wave forms illustrating the operation of the circuit when the input signal and the output of the counter are not in phase.

Figure 1:
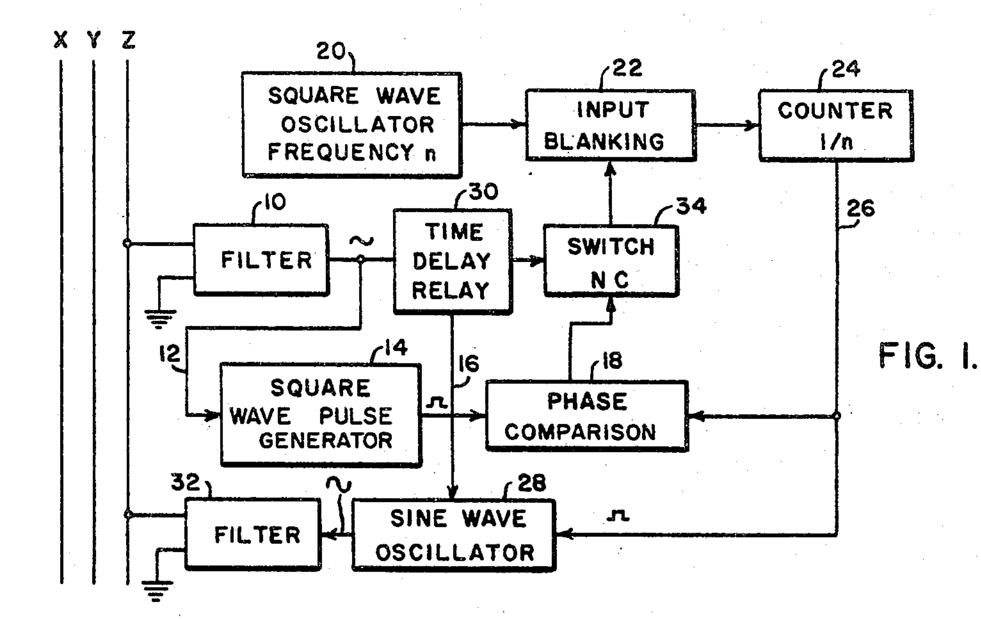

With reference now to the drawings, and particularly to FIG. 1, the invention is illustrated in connection with a warning system wherein a warning signal is impressed upon a three-phase power distribution system having three conductors X, Y and Z. The signal impressed upon the distribution system is generated at a remote station and comprises a relatively weak sine wave signal which, for purposes of illustration, will be assumed to have a frequency of 210 cycles per second. The alternating current power on the three-phase system X, Y and Z has a frequency of 60 cycles per second, as is conventional.

As was mentioned above, the warning system is such that a master signal generator is actuated first. The output of this generator, comprising a relatively weak sine wave signal having a frequency of 210 cycles per second for the example given, passes through a filter circuit 10 which blocks the 60-cycle per second power on the conductor Z. The 210-cycle per second sine wave signal is then applied through lead 12 to drive a pulse generator 14, the output of the pulse generator on lead 16 being a square-wave signal, also having a frequency of 210 cycles per second. This square-wave signal of 210 cycles per second is then applied to a phase comparison circuit 18, hereinafter described in detail.

The system also includes a square-wave oscillator 20 which operates continuously, the output of the oscillator 20 being a square-wave signal at a frequency of 13.44 kilocycles per second. This frequency, is sixty-four times the frequency of the square-wave signal at the output of pulse generator 14. The output square-wave signal from oscillator 20 is applied through an input blanking circuit 22, hereinafter described in detail, to a binary counter 24 which divides the frequency at the output of oscillator 20 by sixty-four. Thus, the output of counter 24 on lead 26 will comprise a square-wave signal having the same frequency as the square-wave signal on lead 16, and the same frequency as the remote signal source connected to conductor Z.

The square-wave signal on lead 26 is also applied to a high power sine wave oscillator 28 to drive the same; however the sine wave oscillator is normally disabled and will not be enabled until ten seconds after the remote signal passes through the filter 10. In this respect, the signal at the output of filter 10 is applied to a time delay relay device 30 which enables or turns on the sine wave oscillator 28 ten seconds after the remote signal is initially received. This enables the circuitry to memorize the phase of the remote signal before oscillations from oscillator 28 are applied to the conductor Z through an L-C filter 32. The time delay relay 30, upon the elapse of ten seconds after initial receipt of the remote signal, also serves to open a normally closed switch 34 between the phase comparison circuit 18 and the input blanking circuit 22.

Figure 2:
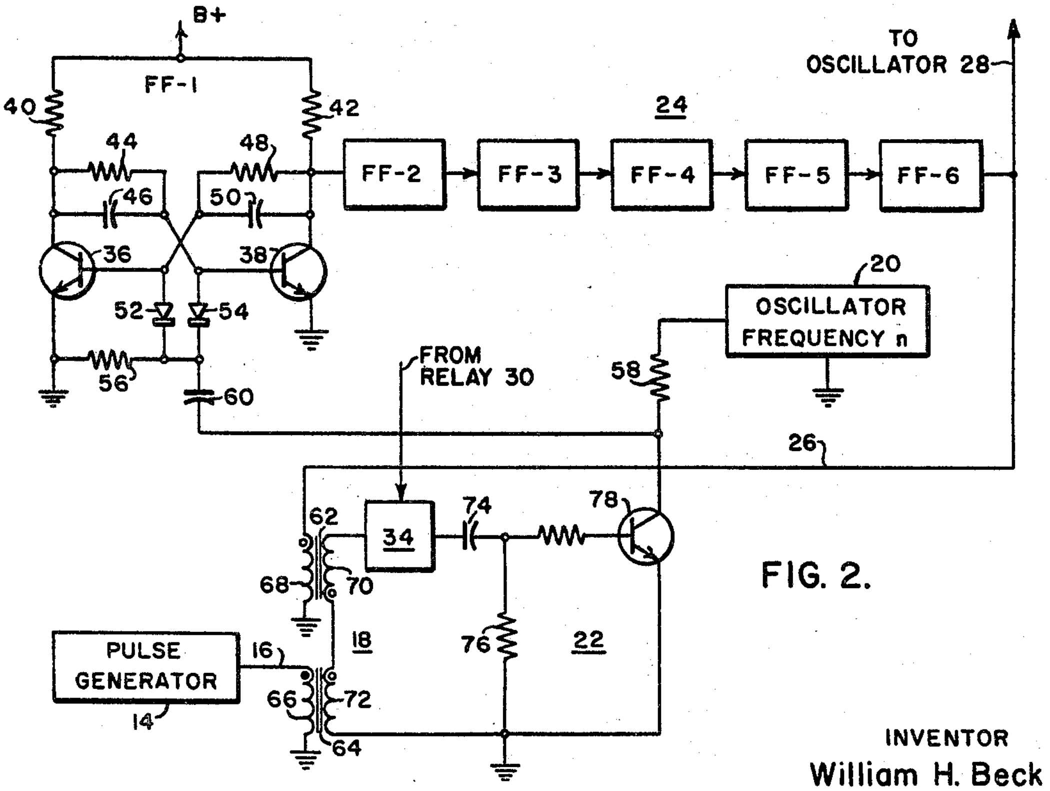
FIG. 2 is a block and schematic circuit diagram of the counting, phase comparison and blanking apparatus of FIG. 1.

With reference, now, to FIG. 2, the counter 24 comprises a series of cascade-connected flip-flop circuits FF–1 through FF–6. All of the flip-flop circuits are identical in construction and operation and, accordingly, only the first flip-flop FF–1 will be described in detail. It comprises two transistors 36 and 38, the emitters of which are both connected to ground. The collectors of the transistors 36 and 38 are connected to a source of B+ voltage through resistors 40 and 42, respectively. The collector of transistor 36 is connected through the parallel combination of resistor 44 and capacitor 46 to the base of transistor 38. Similarly, the collector of transistor 38 is connected to the base of transistor 36 through the parallel combination of resistor 48 and capacitor 50. Input pulses are applied to the bases of both transistors 36 and 38 through input diodes 52 and 54, respectively, the cathodes of these diodes being connected to ground through resistor 56, as shown.

With the arrangement shown, only one of the transistors 36 or 38 can conduct at any one time. Assuming, for example, that the transistor 38 is conducting, the negative-going portion of an input pulse applied to the bases of both transistors 36 and 38 will cut off transistor 38 and initiate conduction in transistor 36. The next successive negative-going portion of an output pulse, on the other hand, will cut off transistor 36 and initiate conduction in transistor 38. Each time transistor 38 conducts, the voltage at the lower end of resistor 42 goes negative; and this voltage is used, in turn, to fire the next flip-flop FF–2. The output of flip-flop FF–2, in turn, is used to actuate flip-flop FF–3.

The binary counter 24, as mentioned above, will produce one output pulse on lead 26 for every sixty-four input pulses of frequency $n$ from the square-wave oscillator 20. That is, each of the flip-flops serves to divide the frequency of the input signal by a power of 2, the first flip-flop FF–1 serving to divide by $2^1$; the second flip-flop FF–2 serving to divide by $2^2$; the third flip-flop FF–3 serving to divide by $2^3$; and so on. As shown, the input pulses applied through diodes 52 and 54 pass from the oscillator 20 through resistor 58 and a coupling capacitor 60.

The phase comparison circuit 18 comprises a pair of input transformers 62 and 64. The primary winding 66 of input transformer 62 is connected to the output of pulse generator 14; while the primary winding 68 of transformer 62 is connected through lead 26 to the output of counter 24. The secondary windings 70 and 72 of transformers 62 and 64 are wound such that when signals of the same polarity are applied to input windings 66 and 68, the polarities of the signals appearing across secondary windings 70 and 72 will be in subtractive or opposing phase relationship. Therefore, the arrangement of transformers 62 and 64 provides a means for comparing the square-wave signals from counter 24 and pulse generator 14.

Assuming that the signals from counter 24 and pulse generator 14 are not in phase with each other, the phase comparison process will produce an output pulse across the series combination of windings 70 and 72. This pulse, after passing through switch 34, is differentiated by capacitor 74 and resistor 76 and applied to the base of transistor 78. Transistor 78 is normally nonconducting, in which case the pulses from oscillator 20 will be applied through resistor 58 and capacitor 60 to the counter 24. When, however, the transistor 78 conducts upon the occurrence of a differentiated output pulse across resistor 76, it will blank a pulse at the output of oscillator 20. That is, during the time that transistor 78 conducts, the pulse from circuit 20 will be shunted or shorted to ground and will not pass to the counter 24.

Operation of the invention may best be understood by reference to FIGS. 3 and 4. In FIG. 3, the wave forms A and B represent those appearing across windings 70 and 72 when the square wave at the output of generator 14 is in phase with that at the output of the counter 24. It can be seen from FIG. 3 that addition of the two wave forms nets zero voltage. Consequently, the transistor 78 remains cutoff and all of the pulses from oscillator 20 are applied to the counter 24.

In FIG. 4, the conditions are shown wherein the signal on lead 16 (i.e., wave form D) is not in phase with wave form C at the output of counter 24. Consequently, when the two signals C and D are added or compared in circuit 18, the wave form E results, this wave form comprising a series of pulses spaced 180° apart. The pulses in wave form E, after passing through the differentiator comprising elements 74 and 76, produce wave form F wherein a spiked pulse is produced at the leading edge of each positive pulse in wave form E. When the pulses in wave form F are applied to transistor 78, they cause the transistor to conduct, thereby blanking pulses from oscillator 20. That is, if the pulses from oscillator 20 normally appear as wave form G, they will appear as wave form H with the blanking pulses F applied to transistor 78. Note that during the periods $t_1$ and $t_2$ in wave form H, the pulses from oscillator 20 are prevented from passing to the counter 24. Consequently, under these circumstances, it will take a longer period of time for the flip-flop FF–6 to switch from one stable state to the other, thereby producing a modified wave form C shown by the dotted outline in FIG. 4. The result, of course, is to shift the leading edges of each of the pulses in wave form C to the right. This action will continue until the pulses in wave form C substantially coincide with those in wave form D, whereupon the output of the phase comparison circuit 18 will be zero and the pulses from counter 24 as applied to sine wave oscillator 28 will be in phase with those from the remote signal source as represented by the square wave on lead 16. All of this will be accomplished within the ten-second delay time of relay 30. In other words, the phase of the signal on lead 26 will be shifted, if necessary, within ten seconds such that it coincides with the phase of the remote signal. After an elapse of ten seconds, the phase comparison circuit 18 is disconnected from the input blanking circuit 22 by switch 34, and sine wave oscillator 28 is enabled to generate a sine wave signal having the same frequency and phase relationship as the remote signal originally on conductor Z.

As will be appreciated, the electrical circuitry of the invention may vary, and is illustrated herein by square-wave circuitry. Assuming that the remote reference signal has an accuracy of one part in $10^4$ and that it is necessary to memorize the phase position to within ten degrees, a resolution of better than ten degrees may be obtained by using the six binary stages shown herein for countdown. If the countdown is proceeding and one of the input pulses is blanked by conduction of transistor 78, the output will produce an output half cycle 5.63° longer than a normal half cycle and then proceed again with the normal count. The net result of this is the desired frequency phase shifted by 5.63°. If, for example, the remote reference were lagging in phase by 90°, it would be the function of the phase comparison and blanking circuit to delete sixteen pulses from the input to the counter 24, resulting in a net phase shift on the square-wave output of 90°.

Although the invention has been shown in connection with a certain specific embodiment, it will be readily apparent to those skilled in the art that various changes in form and arrangement of parts may be made to suit requirements without departing from the spirit and scope of the invention.

I claim:

1. In apparatus for generating a signal having the same frequency and phase relationship as an input signal, the combination of an oscillator having a frequency equal to *n* times the frequency of said input signal, a counter operatively connected to the output of said oscillator for producing an output signal for every *n* cycles of said oscillator, means coupled to the output of said counter for comparing the phase of the signal from the counter with the phase of said input signal, and means coupled to said phase comparing means for blanking pulses from the output of said oscillator to said counter until the phase of the signal at the output of the counter is substantially the same as the phase of said input signal, said latter-mentioned means comprising a differentiator connected across the output of said phase comparing means, a normally closed switch device for applying pulses from the output of said oscillator to said counter, and means for momentarily opening said switch device when said differentiator produces a differentiated pulse.

2. The apparatus of claim 1 wherein said switch device comprises a transistor having its emitter and collector connected across the output of said oscillator, and means connecting the output of said differentiator between the base and emitter of the transistor.

3. In apparatus for impressing upon an electrical signal-carrying medium a local oscillatory signal having the same frequency and phase relationship as a remote signal already impressed upon the electrical signal-carrying medium, the combination of a local square-wave oscillator having an output frequency equal to *n* times the frequency of said remote signal, a counter operatively connected to the output of said square-wave oscillator for producing an output signal for every *n* cycles of said oscillator, means coupled to the output of said counter for comparing the phase of the signal from the counter with the phase of said remote signal, means coupled to said phase comparing means for periodically blanking pulses passing from said oscillator to said counter until the phase of the signal at the output of the counter is substantially the same as the phase of said input signal, and means coupled to the output of said counter and to said phase comparing means and operable when the phase of the signal at the output of the counter is substantially the same as the phase of said input signal for generating said local oscillatory signal for impressing said local oscillatory signal on said signal-carrying medium.

4. In apparatus for impressing upon an electrical signal-carrying medium a local oscillatory signal having the same frequency and phase relationship as a remote signal, the combination of a first local square-wave oscillator having an output frequency equal to *n* times the frequency of said remote signal, a counter operatively connected to the output of said first local square-wave oscillator for producing an output signal for every *n* cycles of said oscillator, a second local square-wave oscillator, first filter means for applying said remote signal on the signal-carrying medium to the input of said second square-wave oscillator whereby the second square-wave oscillator will produce a square-wave output signal having a phase and frequency the same as said remote signal, means coupled to the output of said counter and said second square-wave oscillator for comparing the phase of the signal from the counter with the phase of said square-wave signal from the second square-wave oscillator, means coupled to said phase comparing means for periodically blanking pulses passing from said first-mentioned square-wave oscillator to said counter until the phase of the signal at the output of the counter is substantially the same as the phase of said remote signal, a local sine wave oscillator, second filter means connecting the output of said local sine wave oscillator to said signal-carrying medium, and means coupling the output of said counter to said local sine wave oscillator such that the output signal from the sine wave oscillator will have the same phase and frequency as said remote signal.

5. The apparatus of claim 4 wherein the sine wave oscillator is activated only upon the elapse of a predetermined time following the initial passage of said remote signal through said first filter means.

6. The apparatus of claim 4 and including a time delay relay actuated after a predetermined period of time has elapsed subsequent to passage of said remote signal through said first filter means, switch means controlled by said time delay relay for disconnecting said phase comparing means from said blanking means when the relay is actuated, and means for enabling said local sine wave oscillator when said time delay relay is actuated.

References Cited

UNITED STATES PATENTS

| | | | |
|---|---|---|---|
| 2,881,319 | 4/1959 | Sills | 325—421 X |
| 2,934,604 | 4/1960 | Bizet | 178—53 |
| 2,843,669 | 7/1958 | Six et al. | 178—70 X |
| 2,980,858 | 4/1961 | Grondin et al. | 328—63 |
| 3,024,417 | 3/1962 | Secretan | 328—42 |
| 3,265,986 | 8/1966 | Wyckoff | 331—18 X |

ROBERT L. GRIFFIN, *Primary Examiner.*

B. V. SAFOUREK, *Assistant Examiner.*